Aug. 2, 1966 G. R. BEACHLER ET AL 3,263,918
POWER FACTOR CALCULATOR
Filed Oct. 6, 1964 3 Sheets-Sheet 1
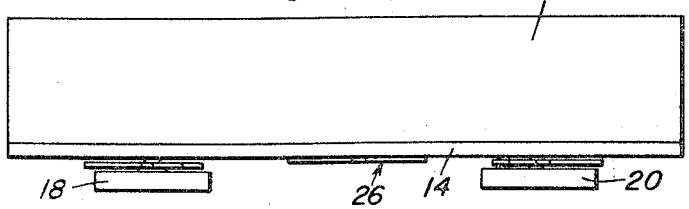
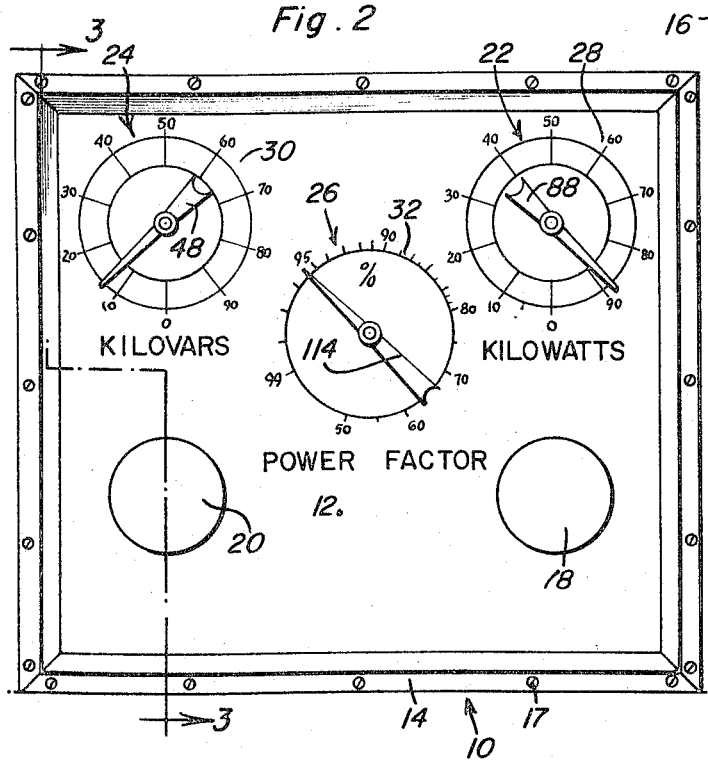
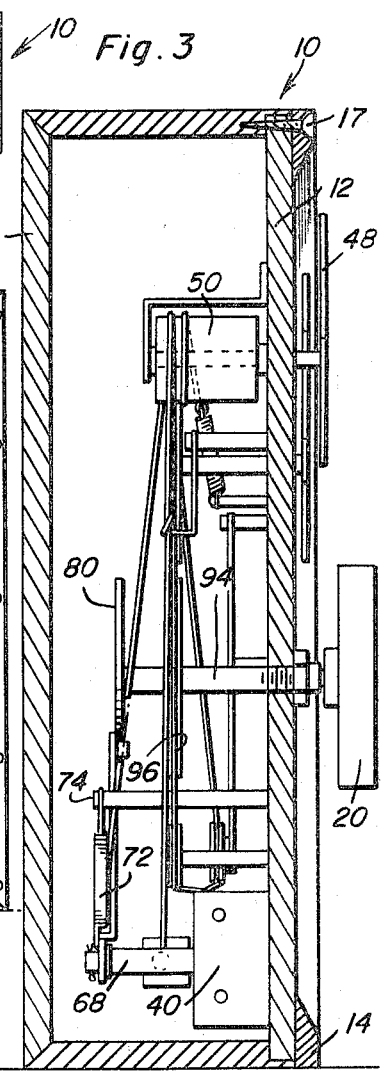
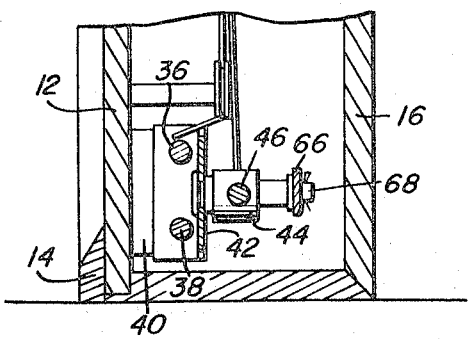
Glen R. Beachler
Ernest C. Pavlicek
INVENTORS
BY *Clarence A. O'Brien*
and *Harvey B. Jacobson*
Attorneys

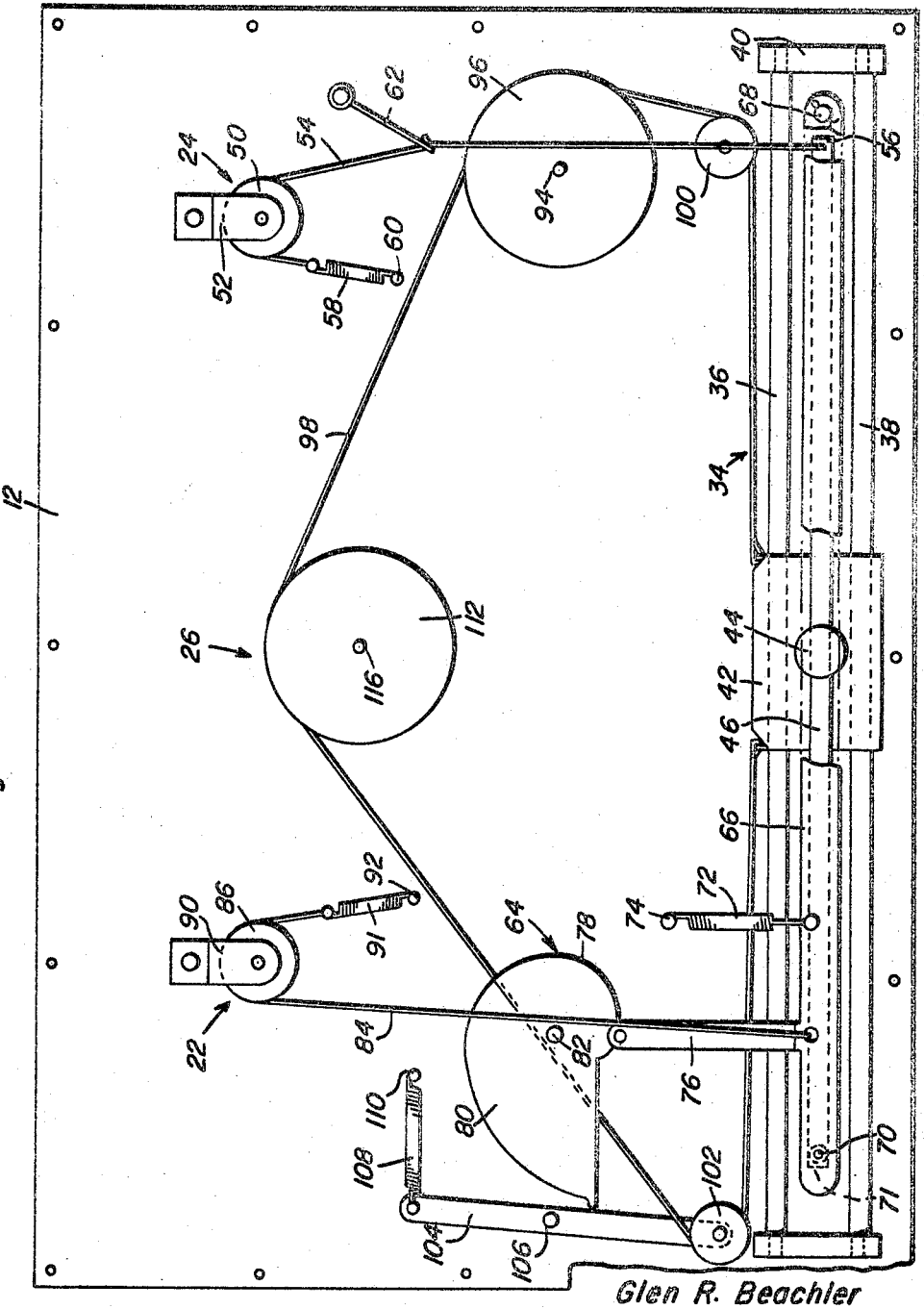

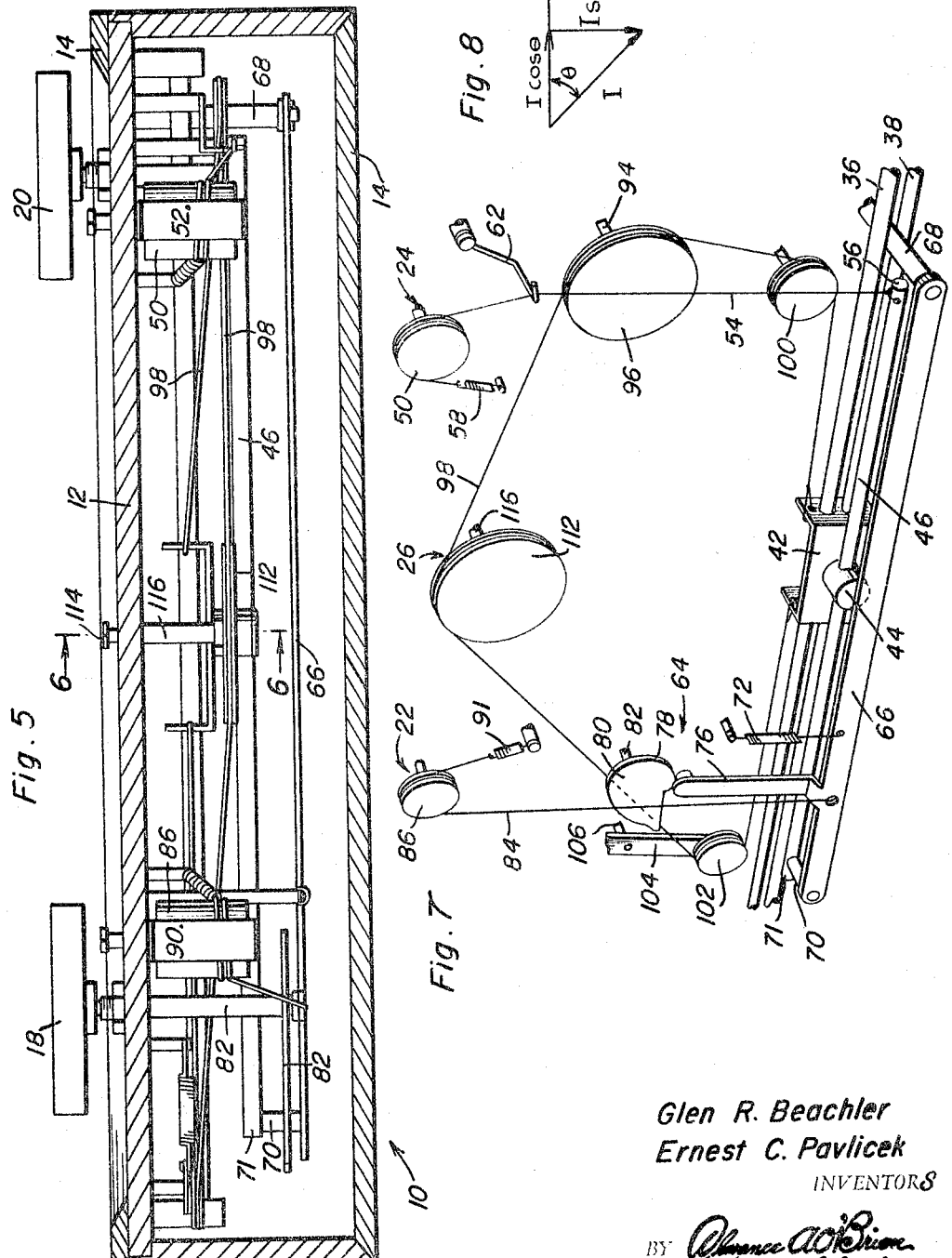

United States Patent Office 3,263,918
Patented August 2, 1966

3,263,918
POWER FACTOR CALCULATOR
Glen R. Beachler, 829 E St., and Ernest C. Pavlicek,
1005 West St., both of Fairbury, Nebr.
Filed Oct. 6, 1964, Ser. No. 401,950
16 Claims. (Cl. 235—61)

This invention relates to a device for calculating power factor from electrical power meter readings and more particularly to a device which will register power factor as a percentage value when supplied with information from which the power factor is to be determined.

The calculator device of the present invention involves a novel arrangement of parts by means of which the power factor of a circuit for example at a power generating plant may be readily determined utilizing the reading from a watt-meter and reactive voltage-ampere meter. Accordingly, use of the calculator device of the present invention will considerably reduce the time necessary to calculate power factor in accordance with formulae involving the meter readings as functions of the power factor.

An additional object of the present invention is to provide a calculator device of the type wherein a function of two variables may be quickly determined, the variables being entered into the device by means of two manual knobs having associated therewith indicators for registering the variable inputs. The arrangement is such that the scales associated with the indicators are linear or involve equal length units whereas only the output reading scale is calibrated in accordance with a non-linear function of the input quantities registered on the two input indicators. The foregoing objectives of the calculator are achieved by use of relatively simple linkages and avoiding complex gearing.

In accordance with the foregoing objects, the calculator device of the present invention embodies a shiftable fulcrum movable by means of a flexible belt along a fixed path so as to vary the drive ratio of a lever pivotally supported on the fulcrum between spaced displacing portions thereon. The displacement of said spaced portions on the lever are therefore registered by a pair of indicators so that one input quantity may be entered through a cam displacing device engageable with one spaced portion of the lever. Accordingly, one of the indicators will register displacement of said latter spaced portion of the lever at a fixed ratio to movement of the cam device in order to show the entry of one of the input variables in the form of kilowatt units for example. The other spaced portion of the lever will be operative to cause displacement of the other indicator at an adjustable ratio, this adjustable ratio then being varied in accordance with the other input variable by shifting of the movable fulcrum aforementioned in order to register kilovar units for example. The shifting of the movable fulcrum is also registered as an output reading in terms of percentages or power factor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the calculator type of the present invention.

FIGURE 2 is a front elevational view of the calculator device.

FIGURE 3 is an elarged transverse sectional view taken substantially through a plane indicated by section line 3—3 in FIGURE 2.

FIGURE 4 is a front elevational view of the operating parts of the calculator mounted on a supporting panel.

FIGURE 5 is a top sectional view through the calculator device.

FIGURE 6 is a partial sectional view taken substantially through a plane indicated by section line 6—6 in FIGURE 5.

FIGURE 7 is a perspective view of the operating parts of the calculator device.

FIGURE 8 is a power factor vector diagram.

Referring now to the drawings in detail, the calculator device is illustrated in its entirety in FIGURES 1 through 3 and 5 and is generally referred to by reference numeral 10. The operating parts of the calculator device are mounted on a front panel member 12 peripherally bounded by a frame 14 secured with the panel member 12 to a rearwardly extending enclosure 16 by means of a plurality of fasteners 17. The panel member 12 rotatably mounts a pair of input knobs 18 and 20 respectively associated with indicators 22 and 24 vertically spaced thereabove as more clearly seen in FIGURE 2. Disposed between the indicators 22 and 24 and spaced therebelow, is an output reading device generally referred to by reference numeral 26. For reasons hereafter explained, the reading obtained on the output device 26, represents the calculated power factor corresponding to a particular power reading registered on the indicator 22 by means of the knob 18 in terms of kilowatt units and a particular power loss registered on the indicator 24 by means of the knob 20 in terms of kilovar units. It will be noted, that the scales 28 and 30 associated with the indicators 22 and 24, are linear or formed by equally spaced unit lengths whereas the power factor scale 32 is non-linear in accordance with a predetermined calibration function. Use of the calculator device will therefore be apparent from the foregoing description. A kilowatt reading is obtained from the watt meter monitoring the electrical equipment, and this reading is registered on the indicator 22 by rotation of the knob 18. Then, a reactive volt-ampere meter reading is obtained and registered on the indicator 24 by rotation of the knob 20. The calculated power factor reading will then appear on the output reading device 26.

Referring now to FIGURES 3, 4, 5 and 7, it will be observed that the panel member 12 forms a mounting frame for the operating parts of the calculator. Fixedly mounted by the panel member adjacent the lower edge thereof within the housing 16, is a guide assembly generally referred to by reference numeral 34. The guide assembly includes a pair of parallel spaced guide rods 36 and 38 mounted on the panel member by the end brackets 40 projecting rearwardly therefrom in order to establish a fixed path of movement for a movable fulcrum member 42. The fulcrum member 42 rotatably mounts a pivot element 44 through which a lever member 46 slidably extends. The lever member 46 forms part of an actuating linkage the drive ratio of which depends upon the position of the pivotal axis established by the fulcrum member 42 relative to the panel 12. One end portion 56 of the lever member 46 is operatively connected to the indicator 24 so that linear displacement of this end portion of the lever member about the pivotal axis established by the fulcrum member 42 will register its displacement.

The pointer 48 associated with the indicator 24 is connected to and driven by a pulley wheel 50 rotatably mounted on the panel 12 by the bracket 52. A flexible cable 54 is entrained about the pulley wheel 50 and has one end thereof connected to the end portion 56 of the lever member while the other end of the cable 54 is connected to an anchor spring 58. The anchor spring 58 is therefore secured at its end 60 to the panel member so as to yieldably bias the pulley wheel 50 and pointer 48 connected thereto to one position. A spring guide element 62 may also be fixedly mounted by the panel member as shown in FIGURES 4 and 7 so as to guide movement of the cable as it is displaced by movement of the end portion 56 of the lever member. The lever member 46 is pivotally displaced about its pivotal axis on the fulcrum element 42 by means of a cam assembly generally referred to by reference numeral 64. The cam assembly includes a pivoted follower element 66 pivotally mounted about an axis fixed to the panel member by means of a pivot pin 68 located adjacent to the end portion 56 of the lever member 46. The opposite end portion of the follower element 66 is pivotally connected by the pin 70 to the end portion 71 of the lever member 46 opposite the end portion 56 and on the other side of the fulcrum axis. Accordingly, the lever member 46 will transmit movement at an adjustable ratio in order to register displacement on the indicator 24 to which the end portion 56 of the lever member is connected by the cable 54. Movement is imparted to the lever member 46 through the pin 70 by pivotal displacement of the follower element 66 about its pivot pin 68 against the bias of the return spring 72. The return spring is secured to the follower element adjacent follower arm 76 and is anchored at 74 to the panel member. The follower arm 76 projects from the follower element 66 between the return spring 72 and the connecting pin 70 for engagement with the cam surface 78 of a radial cam member 80. The cam member 80 is connected to the knob 18 by means of the spindle assembly 82 as more clearly seen in FIGURE 5. Accordingly, rotation of the knob 18 will cause displacement of the lever member 46 and movement of the indicator pointer 48 at an adjustable ratio. However, movement of the knob 18 is registered by the indicator 22 at a fixed ratio.

The indicator 22 is therefore operatively connected directly to the follower element 66 adjacent its juncture with the follower arm 76 by means of the flexible cable 84. The cable 84 is entrained about a pulley wheel 86 to which the pointer 88 is connected, in order to register displacement of the follower element in response to rotation of the knob 18. The pointer 88 therefore cooperates with the dial scale 28 of indicator 22. The pulley wheel 86 to which the pointer 88 is connected, is rotatably mounted about a fixed axis on the panel member by means of the bracket element 90 while the end of the cable 84 entrained about the pulley wheel is yieldably anchored by means of the anchor spring 91 secured at one end 92 to the panel member. It will therefore be apparent, that the anchor springs 91 and 58 respectively associated with the indicators 22 and 24 will yieldably hold the lever member 46 in an initial position from which it may be displaced in response to rotation of the knob 18 through the cam assembly 64. Movement of the cam assembly is at the same time registered by the indicator 22 in terms of electrical power units such as kilowatts.

After the knob 18 is rotated by an amount sufficient to register a power reading on the indicator 22, the knob 20 is then rotated in order to angularly displace the pointer 48 associated with the indicator 24 to a position corresponding to the power loss unit read from another meter such as a varmeter indicating reactive volt-amperes. The knob 20 is therefore connected by means of the spindle assembly 94 to a drive pulley wheel 96 about which there is entrained a flexible cable belt 98. The cable belt 98 is connected to the movable fulcrum member 42 extending therefrom toward the drive pulley wheel 96 and entrained about an idler pulley wheel 100 so as to hold the belt substantially parallel to the guide assembly 34 along the lower run portion of the belt. The belt 98 therefore extends from the fulcrum member 42 in the opposite direction adjacent to the guide assembly and is entrained about an idler pulley wheel 102 rotatably mounted at the end of a belt tightener lever element 104. The belt tightener element 104 is therefore pivotally mounted about a pivot axis fixed to the panel member by the pin 106 and has an end opposite the idler pulley 102 to which a spring element 108 is connected. The spring element 108 is therefore anchored by pin 110 to the panel member and biases the belt tightener lever element 104 in such a direction as to cause the idler pulley 102 to tension the flexible belt 98 in order to maintain it in driving engagement with the drive pulley wheel 96 and a driven pulley wheel 112 associated with the output reading device 26. Rotation imparted to the drive pulley wheel 96 by the knob 20 will therefore impart linear displacement to the fulcrum member 42 in order to shift the fulcrum axis of the lever member 46 and thereby cause displacement of its end portion 56 in order to correspondingly displace the pointer 48 of the indicator 24 so as to set the indicator 24 at the proper reading value in terms of kilovar units for example. Movement so imparted to the fulcrum member 42 for this purpose, will also be reflected by movement of the driven pulley wheel 112 so as to angularly displace the pointer 114 connected to the driven pulley wheel by a spindle assembly 116 as more clearly seen in FIGURE 5.

From the foregoing description, it will be apparent that the displacement respectively registered by the indicators 22 and 24 will prescribe the position to which the fulcrum member 42 is displaced so that displacement of the fulcrum member as reflected by the pointer 114 on the output reading device 26 will be approximately proportional to the ratio of displacement reflected by the indicator 22 to the displacement reflected by the indicator 24. From the vector diagram illustrated in FIGURE 8, showing for example current (I) lagging voltage (E) by $\theta$ degrees, it is well known that $P = EI (\cos \theta)$ where P is the useful power, EI is the total power and $\cos \theta$ is the power factor. It is also known, that the power loss or reactive volt-amperes $(VAR) = EI \sin \theta$. From the foregoing relationships, $$\text{power factor (P.F.)} = \sqrt{\frac{1}{\left(\frac{VAR}{P}\right)^2 + 1}}$$

which is the ratio of useful power to total power.

Since the ratio $VAR/P$ is proportional to the ratio of displacements respectively reflected by the indicators 22 and 24, it will be apparent that the power factor scale 32 associated with the output reading device 26 may be calibrated in accordance with the expression $$P.F.^2 = \frac{1}{R^2 + 1}$$

where R equals $VAR/P$ and is proportional to the ratio of the displacements reflected by the indicators 22 and 24. Accordingly, linear scales 28 and 30 are associated with the indicators 22 and 24 and a non-linear scale 32 calibrated in accordance with the foregoing expression will be associated with the power factor reading device 26. It should of course also be appreciated that different calibrations of the scales may be utilized where an ammeter is utilized in lieu of a varmeter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A calculator for determining power factor from readings of wattage and reactive volt-amperes comprising a frame, a lever having spaced displacing portions, a pair of indicators mounted by the frame means connecting one of the indicators to one of said spaced displacing portions of the lever for registering power loss readings, first input means drivingly connected to the lever at the other of said spaced displacing portions and to the other of said indicators to register power readings, movable fulcrum means pivotally mounting said lever, linear displacing means operatively connected to the fulcrum means for movement thereof relative to the frame, second input means operatively engageable with the linear displacing means for movement of the fulcrum means to a position causing displacement of said one of the spaced displacing portions, and output registering means operatively engageable with the linear displacing means for registering the percentage of useful power to total power coresponding to said position of the fulcrum means.

2. The combination of claim 1 wherein said linear displacing means comprises, a flexible belt connected to said fulcrum means, and belt tightener means engageable with the flexible belt for holding the same in driving engagement with the second input means and the output registering means.

3. The combination of claim 2 wherein each of said indicators comprises, a pulley wheel rotatably mounted by the frame, a flexible cable entrained about said pulley wheel, yieldable anchor means connected to one end of said cable, means connecting the other end of the cable to one of the spaced displacing portions of the lever, and a dial pointer connected to said pulley wheel.

4. The combination of claim 3 wherein said first input means comprises, a follower element connected to said other of the displacing portions of the lever means, a cam member engageable with said follower element, and a manual knob drivingly connected to said cam member.

5. The combination of claim 4 wherein said second input means comprises a drive wheel and a knob connected to said drive wheel.

6. The combination of claim 5 wherein said output registering means comprises, a driven wheel, a pointer connected to said driven wheel and a dial scale fixed to the frame and cooperating with said pointer, said scale being calibrated as non-linear function of the ratio of power units to power loss units.

7. The combination of claim 6 wherein said fulcrum means comprises, guide means extending between said spaced displacing portions of the lever, and a pivot member slidably mounted by the guide means and pivotally supporting the lever intermediate the spaced displacing portions thereof.

8. A calculator for determining power factor from readings of wattage and reactive volt-amperes comprising, a frame, a lever having spaced displacing portions, a pair of indicators mounted by the frame, means connecting one of the indicators to one of said spaced displacing portions of the lever for registering power loss readings, first input means drivingly connected to the lever at the other of said spaced displacing portions and the other of said indicators to register power readings, movable fulcrum means pivotally mounting said lever, linear displacing means operatively connected to the fulcrum means for movement thereof relative to the frame, second input means operatively engageable with the linear displacing means for movement of the fulcrum means causing displacement of said one of the spaced displacing portions, and output registering means operatively engageable with the linear displacing means for registering the percentage of useful power to total power corresponding to the position of the fulcrum means, each of said indicators comprising, a pulley wheel rotatably mounted by the frame, a flexible cable entrained about said pulley wheel, yieldable anchor means connected to one end of said cable, means connecting the other end of the cable to one of the spaced displacing portions of the lever, and a dial pointer connected to said pulley wheel.

9. A calculator for determining power factor from readings of wattage and reactive volt-amperes comprising, a frame, a lever having spaced displacing portions, a pair of indicators mounted by the frame, means connecting one of the indicators to one of said spaced displacing portions of the lever for registering power loss readings, first input means drivingly connected to the lever at the other of said spaced displacing portions and the other of said indicators to register power readings, movable fulcrum means pivotally mounting said lever, linear displacing means operatively connected to the fulcrum means for movement thereof relative to the frame, second input means operatively engageable with the linear displacing means for movement of the fulcrum means causing displacement of said one of the spaced displacing portions, and output registering means operatively engageable with the linear displacing means for registering the percentage of useful power to total power corresponding to the position of the fulcrum means, said first input means comprising, a follower element connected to said other of the displacing portion of the lever means, a cam member engageable with said follower element, and a manual knob drivingly connected to said cam member.

10. The combination of Claim 9 wherein said second input means comprises a drive wheel and a knob connected to said drive wheel.

11. A calculator for determining power factor from readings of wattage and reactive volt-amperes comprising, a frame, a lever having spaced displacing portions, a pair of indicators mounted by the frame, means connecting one of the indicators to one of said spaced displacing portions of the lever for registering power loss readings, first input means drivingly connected to the lever at the other of said spaced displacing portions and the other of said indicators to register power readings, movable fulcrum means pivotally mounting said lever, linear displacing means operatively connected to the fulcrum means for movement thereof relative to the frame, second input means operatively engageable with the linear displacing means for movement of the fulcrum means causing displacement of said one of the spaced displacing portions, and output registering means operatively engageable with the linear displacing means for registering the percentage of useful power to total power corresponding to the position of the fulcrum means, said output registering comprising, a driven wheel, a pointer connected to said driven wheel and a dial scale fixed to the frame and cooperating with said pointer, said scale being calibrated as a nonlinear function of the ratio of power units to power loss units.

12. A calculator for determining power factor from readings of wattage and reactive volt-amperes comprising, a frame, a lever having spaced displacing portions, a pair of indicators mounted by the frame, means connecting one of the indicators to one of said spaced displacing portions of the lever for registering power loss readings, first input means drivingly connected to the lever at the other of said spaced displacing portions and the other of said indicators to register power readings, movable fulcrum means pivotally mounting said lever, linear displacing means operatively connected to the fulcrum means for movement thereof relative to the frame, second input means operatively engageable with the linear displacing means for movement of the fulcrum means causing displacement of said one of the spaced displacing portions, and output registering means operatively engageable with the linear displacing means for registering the percentage of useful power to total power corresponding to the position of the fulcrum means, said fulcrum means comprising, guide means extending between said spaced displacing portions of the lever, and a pivot member slidably mounted by the guide means and pivotally supporting the lever intermediate the spaced displacing portions thereof.

13. A calculator comprising, a frame, lever means having spaced displacing portions, a pair of flexible cables, means connected one of said cables to one of said spaced portions of the lever means, yieldable anchor means connected to said cables for yieldably holding the lever means in an initial position, a fulcrum member pivotally supporting the lever means between said spaced portions thereof, guide means mounting said member for movement along a fixed path, flexible belt means connected to said member for movement thereof, cam means operatively the other of said cables and the other of said spaced portions of the lever means for angular displacement thereof on the fulcrum member, first indicator means drivingly engaged with one of said pair of cables for registering displacement imparted thereto in response to rotation of the cam means, second indicator means drivingly engaged with the other of said pair of cables for registering displacement imparted thereto in response to movement of the flexible belt means, and output reading means driven by the flexible belt means for registering displacement of the belt means.

14. The combination of Claim 13 wherein said output reading means comprises, a driven wheel engaged with said flexible belt means, a pointer connected to said wheel and a scale cooperating with said pointer, said scale being divided into non-linear units calibrated in accordance with the expression $$\frac{1}{R^2+1}$$

where R is proportional to the ratio of linear displacements of the pair of cables.

15. A calculator comprising a frame, a movable fulcrum, a lever pivotally mounted by the fulcrum, plural indicator means operatively connected to the lever for registering displacements of the lever relative to the frame at spaced distances from the fulcrum, means for displacing said fulcrum along a fixed path on the frame, output means for registering displacement of the fulcrum relative to the frame, and manual input means for selectively displacing the lever relative to the fulcrum and the fulcrum relative to the frame in accordance with readings registered on said indicator means.

16. A calculator comprising a frame, a lever having opposite end portions, a fulcrum pivotally mounting said lever between said end portions thereof, guide means mounted by the frame for constraining movement of the fulcrum to a fixed path, selectively actuated drive means mounted by the frame and operatively connected to the fulcrum for displacement thereof along said fixed path, selectively actuated cam means mounted by the frame, follower means pivotally mounted by the frame and connected to one of the end portions of the lever, said follower means having a driving portion engageable by the cam means for pivotal displacement of the lever, a pair of indicators mounted by the frame, tensioned drive means respectively connecting said indicators to the other of the end portions of the lever and to the driving portion of the follower means for measuring displacement of the lever, and output means drivingly connected to the fulcrum for registering the position thereof along the fixed path.

References Cited by the Examiner
UNITED STATES PATENTS

| | | | |
|---|---|---|---|
| 542,523 | 7/1895 | Holden | 177—32 |
| 1,779,774 | 10/1930 | Julius | 235—61 |
| 2,045,621 | 6/1936 | Spitzglass | 235—61 |
| 2,096,032 | 10/1937 | Engel | 235—61 |
| 2,444,549 | 7/1948 | Anderson | 235—61 |
| 2,450,283 | 9/1948 | Jones | 235—61 |
| 2,736,490 | 2/1956 | Schneider | 235—61 |
| 2,767,909 | 10/1956 | Morris | 235—61 |

LOUIS J. CAPOZI, *Primary Examiner.*

LEO SMILOW, *Examiner.*

T. J. ANDERSON, *Assistant Examiner.*